Sept. 16, 1958 C. A. SCHELLENS 2,852,031
MEANS FOR REGULATING THE PRESSURE OF BOILER FEED PUMPS
Filed June 15, 1955 2 Sheets-Sheet 1

Inventor
Christopher A. Schellens
by Wright, Brown,
Quinby & May
Attys.

Sept. 16, 1958     C. A. SCHELLENS     2,852,031
MEANS FOR REGULATING THE PRESSURE OF BOILER FEED PUMPS
Filed June 15, 1955     2 Sheets-Sheet 2

Inventor
Christopher A. Schellens
by Wright, Brown,
Quinby May Attys.

2,852,031

MEANS FOR REGULATING THE PRESSURE OF BOILER FEED PUMPS

Christopher A. Schellens, St. George, Maine; Belton A. Copp, executor of said Christopher A. Schellens, deceased Application June 15, 1955, Serial No. 515,618

6 Claims. (Cl. 137—95)

This invention relates to a means for regulating the delivery pressure of a fluid pump in relation to the current pressure within a closed container. More particularly the invention relates to the regulation of the pressure of feed water which is being supplied to a steam boiler so that the feed water will be forced into the boiler at a pressure which exceeds the boiler pressure by a substantially constant amount, regardless of fluctuations in the boiler pressure or change in the rate of consumption of steam from the boiler.

It has been found advantageous in steaming practice to maintain an uninterrupted inflow of feed water into a steam boiler to replace that which is discharged in the form of steam.

When the rate of consumption of steam varies considerably as for example when a steamship is maneuvering, a sharp drop in the rate of steam consumption will result in a rise in the water level in the drum. To limit and control such rise, it is customary to throttle down gradually the inflow of feed water either manually or by automatic means. Such throttling would ordinarily tend to build up pressure in the feed water line which pressure would tend to offset the throttling effect. This tendency is avoided by regulating the pressure in the feed water line to maintain a substantially constant difference between that pressure and the pressure in the boiler. This can be done by regulating the speed of operation of the feed water pump, speeding up the pump when the pressure difference falls below the desired figures, and slowing down the pump when the pressure difference is higher than the desired figure. In the embodiment of the invention hereinafter described, the speed of the pump is controlled by regulation of the steam supply to the motor which drives the pump. Such regulation can be had by a balanced throttle valve in the steam line to the pump motor and pressure-responsive means, such as a piston connected to the valve, for varying the valve opening. For actuation of the piston, opposing pressures are arranged to be exerted thereon, the delivery pressure of the feed water acting on the piston in one direction and being opposed by the combined pressures of the steam in the boiler and of an adjustable spring. Since the opposing pressures are substantially in balance, the spring pressure represents the difference between the feed water pressure and the boiler pressure. By adjusting the tension of the spring, any desired pressure difference can be had. While such apparatus is effective in principle, it is subject to difficulties in continued operation. For example if there is leakage of steam past the piston rod which actuates the valve, the piston chamber is apt to become heated sufficiently to precipitate from the feed water minerals which remain in solution at ordinary feed water temperatures. The precipitate takes the form of a scale which is deposited in the fine clearances between moving parts of the apparatus. This interferes with the proper functioning of the mechanism. Isolating the hot and cold parts of the mechanism to avoid this difficulty results in a costly and cumbersome structure having additional packing glands the friction of which decreases the sensitivity of the apparatus. The use of a diaphragm instead of the piston is undesirable as diaphragms do not operate satisfactorily with high boiler pressures, sufficient deformation of the diaphragm not being obtainable without exceeding the elastic limit. Under such conditions, diaphragms are subject to rupture after a relatively short period of use, and provide a hazard to personnel due to steam escaping through the ruptured diaphragm.

According to the present invention, provision is made for a constant flow of feed water through the steam pressure pipe into the boiler in a small stream which may be barely a trickle. This is done by apparatus more fully hereinafter described.

Figure 1:
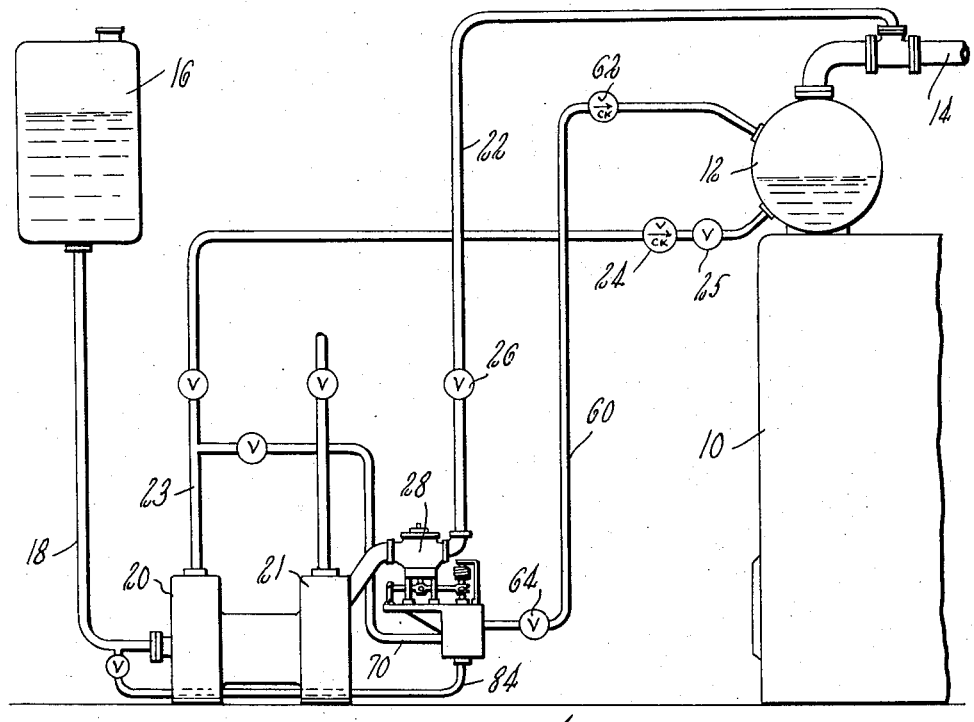
Figure 1 is a diagrammatic elevation of apparatus embodying the invention.

The apparatus shown in Figure 1 comprises a steam boiler 10 having a steam drum 12 from which leads a discharge pipe 14 through which steam is directed to a power unit (not shown) or for other uses. Feed water for the boiler may be supplied from any suitable source such as a tank 16 from which a pipe 18 leads to the suction end of a pump 20. The pump may be driven by any suitable prime mover the speed of which can be regulated. As shown, the pump is connected to a steam turbine 21 which may be driven by steam from the boiler 10 supplied through a pipe 22 from the discharge line 14.

The pump 20 discharges into a discharge line 23 that leads to the steam drum 12. Connected in the pipe line 23 are a check valve 24 and a throttle valve 25. The check valve is arranged to prevent flow out of the drum through the pipe 23 when the pressure therein falls below the boiler pressure as, for example, when the pump 20 is shut down. The throttle valve is operated either manually or by any suitable automatic apparatus (not shown) to throttle the flow of feed water to maintain a constant level of water in the drum. The pressure on the discharge side of the valve 25 is substantially that of the steam drum 12 while that on the inlet side of the valve is that of the pump discharge. In order to make the throttling action of the valve 25 effective, a reasonably constant pressure difference between the inlet and outlet of the valve should be maintained. This is done by means of the following apparatus.

Figure 2:
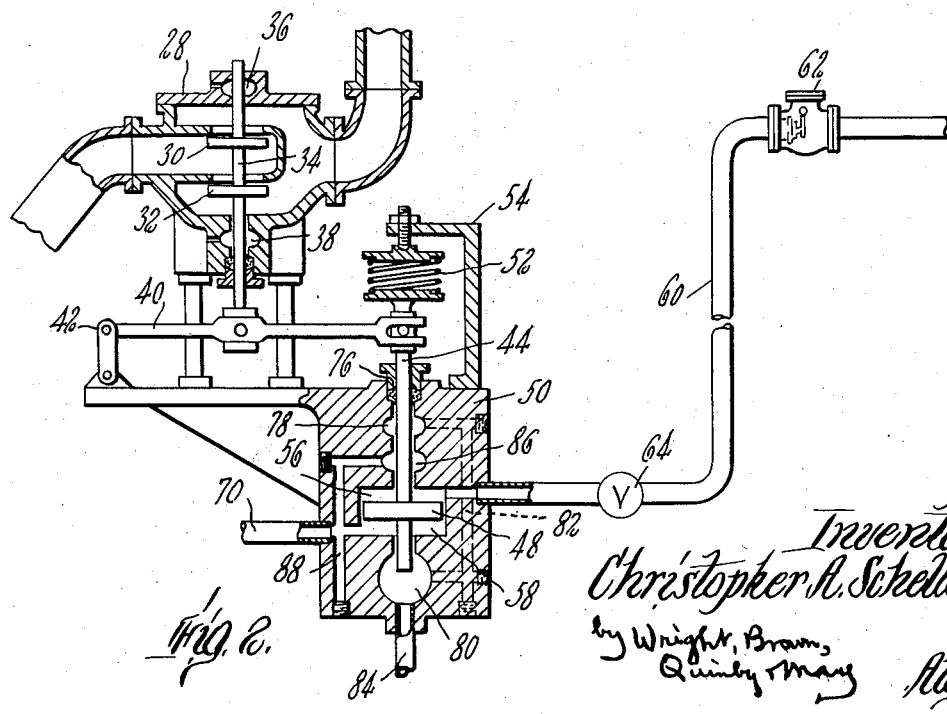
Figure 2 is a sectional view, on a larger scale, of some of the apparatus shown in Figure 1.

Connected in the steam pipe line 22 are a stop valve 26 and a regulating valve 28. As shown in Figure 2, the latter is preferably of the "balanced" type including two disks 30 and 32 on a reciprocable stem 34. In order to avoid sticking of the valve, tightly packed glands about the stem are avoided and breakdown chambers 36 and 38 are provided in the valve casing to receive the steam that leaks along the stem, this steam being conducted away to any desired point of disposal.

The stem 34 is axially moved to open or close the balanced valve by a lever 40 one end of which is pivoted at 42, the other end being connected to a vertically movable rod 44. Secured to this rod is a piston 48 which is slidable in a piston chamber within a cylinder 50. The rod 44 projects from the upper end of the cylinder and the projecting end is pressed by an adjustable spring 52 which is supported by a suitable bracket 54. The piston 48 divides the interior of the cylinder casing into an upper piston chamber 56 and a lower chamber 58 which vary in volume as the piston moves up or down. A pipe line 60 connects the upper piston chamber 56 with the steam drum 12 so that boiler pressure is maintained against the upper face of the piston 48. A check valve 62 is connected in the pipe 60 to prevent escape of steam through the pipe 60 if the pressure in the chamber 56 should drop below the boiler pressure as for example when the motor is shut down. This pipe may also be provided with a stop valve 64.

A pipe line 70 connects the lower piston chamber 58 with the pump discharge line 23 which leads to the steam drum through the check valve 24. The feed water delivery pressure is thus maintained against the lower face of the piston 48, this pressure being greater than the boiler pressure acting on the upper face of the piston. To balance the opposed forces acting on the piston, the spring 52 is arranged to act on the piston in the same direction as the boiler pressure thereon. The spring is adjusted to the desired pressure difference between the feed water pump discharge and the steam pressure in the boiler, and this difference is maintained approximately constant in spite of variations in the boiler pressure or in the feed water pump delivery pressure due to variations in volumetric demand for feed water.

As the piston should be free to move up or down with little resistance, a lightly packed gland 76 is provided for the piston rod where it emerges from the cylinder casing 50. Between the gland end and the piston chamber a breakdown chamber 78 is provided for the upper portion of the piston rod, a lower breakdown chamber 80 being provided for the lower portion of the piston rod. These chambers are connected to each other by a duct 82, and water leaking thereinto is carried off by a pipe 84 to any convenient low pressure point of disposal such as the suction end of the feed water pump 20.

A third chamber 86 may be provided in the cylinder casing between the piston chamber 56 and the breakdown chamber 78, this third chamber being connected to the feed water line 70 by a duct 88. Since the feed water pressure in the pipe 70 is greater than the boiler pressure, leakage of feed water will occur from the lower piston chamber 58 past the periphery of the piston into the upper piston chamber 56 and also from the chamber 86 down into the piston chamber 56. This will result in a positive trickle flowing in the pipe 60 to the boiler, thus maintaining the cylinder 50 and its contents at the temperature of the supplied feed water.

The operation of the regulator is as follows: If the boiler pressure drops, or if the discharge pressure rises due to a throttling of the feed valve 25, the balance of forces acting on the piston 48 is disturbed and the piston rises. This moves the steam valve disks 30 and 32 to cut down the steam supply to the turbine 21 which drives the feed water pump 20. This pump slows down until the reduction of pressure of the feed water delivered thereby is sufficient to restore the balance of forces acting on the piston 48. This restores the desired pressure differences between the feed water and the boiler steam as determined by the setting of the spring 52. If the boiler pressure rises or if the discharge pressure drops the reverse operation takes place.

Figure 3:
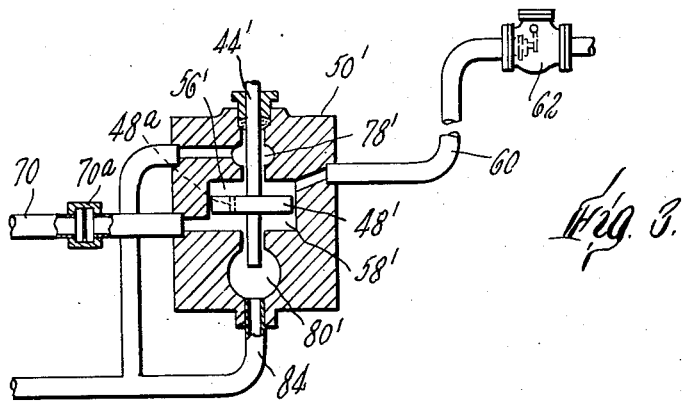
Figures 3, 4 and 5 are sectional views of different modified forms of the invention.
Figure 4:
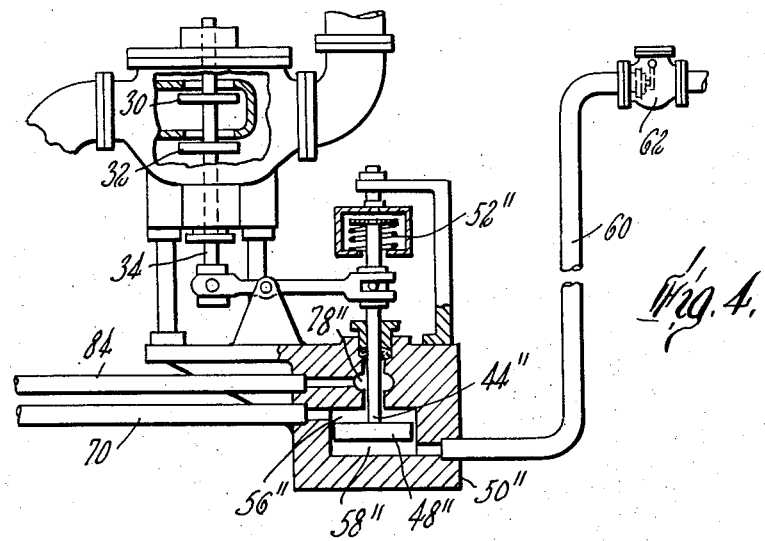
Figure 5:
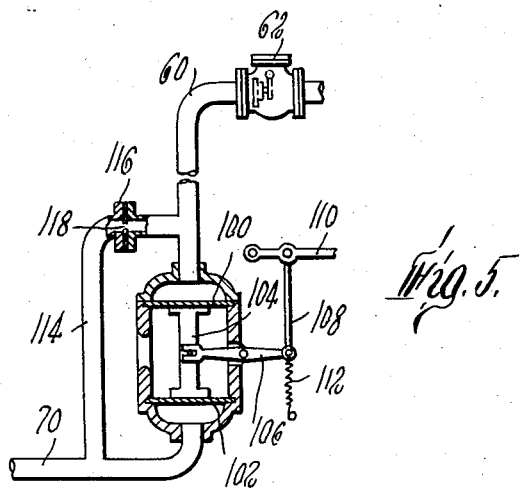

Comparable results in maintaining a constant difference between feed water pressure and boiler pressure and keeping steam away from the regulating apparatus can be had by the modified forms of the invention illustrated in Figures 3, 4 and 5. The apparatus shown in Figure 3 is substantially identical with that shown in Figure 2 except that the intermediate chamber 86 and its duct are omitted. A cylinder 50' encloses a piston chamber in which slides the piston 48' dividing the chamber into upper and lower chambers 56' and 58'. The feed water pipe 70 leads to the lower chamber 58'. The pipe 60 from the boiler leads to the upper chamber 56'. Two breakdown chambers 78' and 80' are provided above and below the piston chambers and are connected to the return pipe 84. The upper part of the piston rod 44' passes through the upper chamber 78'. The lower end of the piston projects into the chamber 80'. The upper piston chamber 56' is connected to the pipe 60 which goes to the boiler. There will be leakage of feed water past the edge of the piston into the upper chamber 56' and from this chamber to the breakdown chamber 78'. If the latter leakage should exceed the former there would be no flow from the piston chamber 56' into the pipe 60. The clearances surrounding the piston and rod peripheries are exceedingly fine and it is not possible to control the amount of leakage by proportioning the clearances, due to sediment going through these clearances. Since a principal object of the invention is to maintain in the pipe 60 a positive flow toward the boiler, I provide a small hole 48a in piston 48 together with a strainer 70a in the pipe 70, having a smaller mesh than the diameter of the hole. By proportioning the size of this hole to provide a leakage which is substantially above the trickle passing through the clearances I ensure that at all times there is a flow in the pipe 60 towards the drum.

In the form of the invention shown in Figure 4, the piston rod 44" has no portion below the piston 48". The cylinder 50" has a piston chamber divided into an upper portion 56" and lower portion 58". The pipe 60 from the boiler enters the latter, the feed water pressure pipe 70 entering the upper piston chamber 56". The piston rod 44" passes through a breakdown chamber 78" which drains into the pipe 84. Since in this case the feed water presses downward on the piston 48", the spring 52" is arranged to press upward on the piston rod 44" to provide the balancing force augmenting the pressure of the liquid in the pipe 60 on the piston 48". The lever 40" which connects the piston rod 44" to the valve stem 34 is rigged so that downward movement of the piston 48" tends to close the valve 30, 32. The leakage past the piston provides the positive flow in the pipe 60 to the boiler. In this form of the invention the piston areas subjected to fluid pressures differ by the cross-sectional area of the rod 44" so that a strictly constant pressure difference cannot be maintained, but the variation may be unimportant in certain applications.

In the form of the invention shown in Figure 5, impervious flexible diaphragms 100 and 102 are substituted for the piston. These diaphragms are connected by a central rod 104 so that they act as a unit to rock a pinned lever 106 which is connected by a link 108 to a lever 110 which actuates the throttle valve by a relay (not shown). The diaphragm 100 is pressed downward by fluid in the pipe 60 which transmits the pressure of the boiler. The diaphragm 102 is pressed upward by fluid in the feed water pipe which is at a higher pressure than the boiler pressure. This difference of pressure acting on the diaphragms is balanced by a spring 112 attached to the lever 106. Since no leakage past the diaphragms is possible, the pipe 70 is connected to the pipe 60 by a by-pass 114 in which is a diaphragm 116 having a small hole or orifice 118 through which a small flow is constantly maintained.

In the event of rupture of the upper diaphragm the check valve 62 closes and prevents the escape of steam from the boiler, eliminating a serious hazard to the operator. At the same time under operating conditions the pressure on diaphragm 100 is always equal to the drum pressure as called for in the proper functioning of the valve.

It is to be understood that prime movers other than a steam-driven turbine can be employed to drive the feed water pump and can be regulated by suitable pressure-responsive means appropriate for the particular kind of prime mover employed.

In all of the embodiments of the invention herein before described, a small but positive flow to the boiler is maintained in the pipe which transmits the boiler pressure to the regulator. This effectively prevents high-temperature water or steam from reaching the regulator. Thus the precipitation of scale from the feed water in the regulator is prevented in the case of piston operation and the hazard due to a ruptured diaphragm is eliminated in the case of diaphragm operation.

I claim:

1. A steam boiler having a drum, a pump having a discharge pipe for delivering feed water to said drum, throttling means in said pipe, means for regulating the pump discharge pressure at the inlet of said throttling means to maintain said discharge pressure at a constant excess over the pressure in said drum, said pressure regulating means including pressure-responsive means actuated by drum pressure in the direction to increase said discharge pressure and actuated by said discharge pressure in a direction to decrease the same, a conduit leading from the drum to said pressure responsive means to provide drum pressure thereto, a second conduit leading from said discharge pipe to said pressure responsive means to provide discharge pressure thereto, and means providing a small leakage between said conduits whereby a positive flow is maintained in the first said conduit toward the drum.

2. In combination with a steam boiler, a feed water pump having a discharge line connected to said boiler, throttling means in said discharge line, and a prime mover operatively connected to said pump; means for regulating the operation of said prime mover to maintain a substantially constant pressure difference between the pump discharge and the boiler pressure, said regulating means including a piston rod axially movable to increase or decrease the power supplied to said prime mover, a piston on said piston rod, a cylinder having a chamber in which said piston is slidably fitted with clearance for a slight leakage past the piston, said cylinder having therein a breakdown chamber through which said piston rod passes, a duct connecting the discharge line of said pump with one end of the piston chamber, a second duct connecting said boiler with the other end of said piston chamber, a check valve in said second duct preventing outflow therethrough from said boiler, a discharge duct leading from said breakdown chamber, and mechanical means exerting a substantially constant force on said rod to balance the difference of fluid pressures on opposite sides of said piston.

3. Apparatus as in claim 2, said discharge duct from the breakdown chamber communicating with the suction end of said pump.

4. Apparatus as in claim 3, said cylinder having an intermediate chamber between the first said breakdown chamber and said piston chamber, and a duct connecting said intermediate breakdown chamber with the discharge end of said pump.

5. In combination with a member movable to control the speed of a motor, a pressure-responsive regulating device comprising a reciprocable rod operatively connected to said member, a piston on said rod, a cylinder in which said piston is slidably fitted, said piston dividing the interior of the cylinder into two chambers of variable capacity and having a slight clearance between its periphery and the wall of the cylinder to permit slow leakage past the piston, a duct for fluid under pressure opening into one of said chambers, a second duct for fluid normally under higher pressure opening into the other said chamber, adjustable means constantly acting on said piston to reinforce the pressure of the first said fluid thereon by a predetermined amount, and a check valve in the first said duct to prevent flow of fluid therein toward said cylinder.

6. In combination with a member movable to control the speed of a motor pressure-responsive regulating device comprising a cylinder casing, a piston slidably fitted in said cylinder to form variable upper and lower chambers therein, said piston having a slight clearance at its periphery to permit slow leakage of fluid from one said chamber to the other, a piston rod secured to said piston and projecting out through the upper end of said cylinder casing, means operatively connecting said piston rod to said movable member, a packed gland about said rod at the upper end of said casing, said casing having two spaced auxiliary chambers through which said rod extends between said upper piston chamber and said gland, said casing having a third auxiliary chamber into which said rod extends below said lower piston chamber, said rod having slight clearances between it and the casing between successive said chambers to permit slow leakage from any of said chambers to the next adjacent chambers, a duct entering said casing and communicating with the lower piston chamber and with the auxiliary chamber next above the upper piston chamber, a second duct entering the casing and communicating with the upper piston chamber, and a third duct entering the casing and communicating with the uppermost and lowermost auxiliary chambers.

References Cited in the file of this patent

UNITED STATES PATENTS

| | | |
|---|---|---|
| 571,834 | Immendorf et al. | Nov. 24, 1896 |
| 1,147,401 | Huttner | July 20, 1915 |
| 1,250,863 | Halliwell | Dec. 18, 1917 |
| 2,227,532 | Cave | Jan. 7, 1941 |